Figure 1:
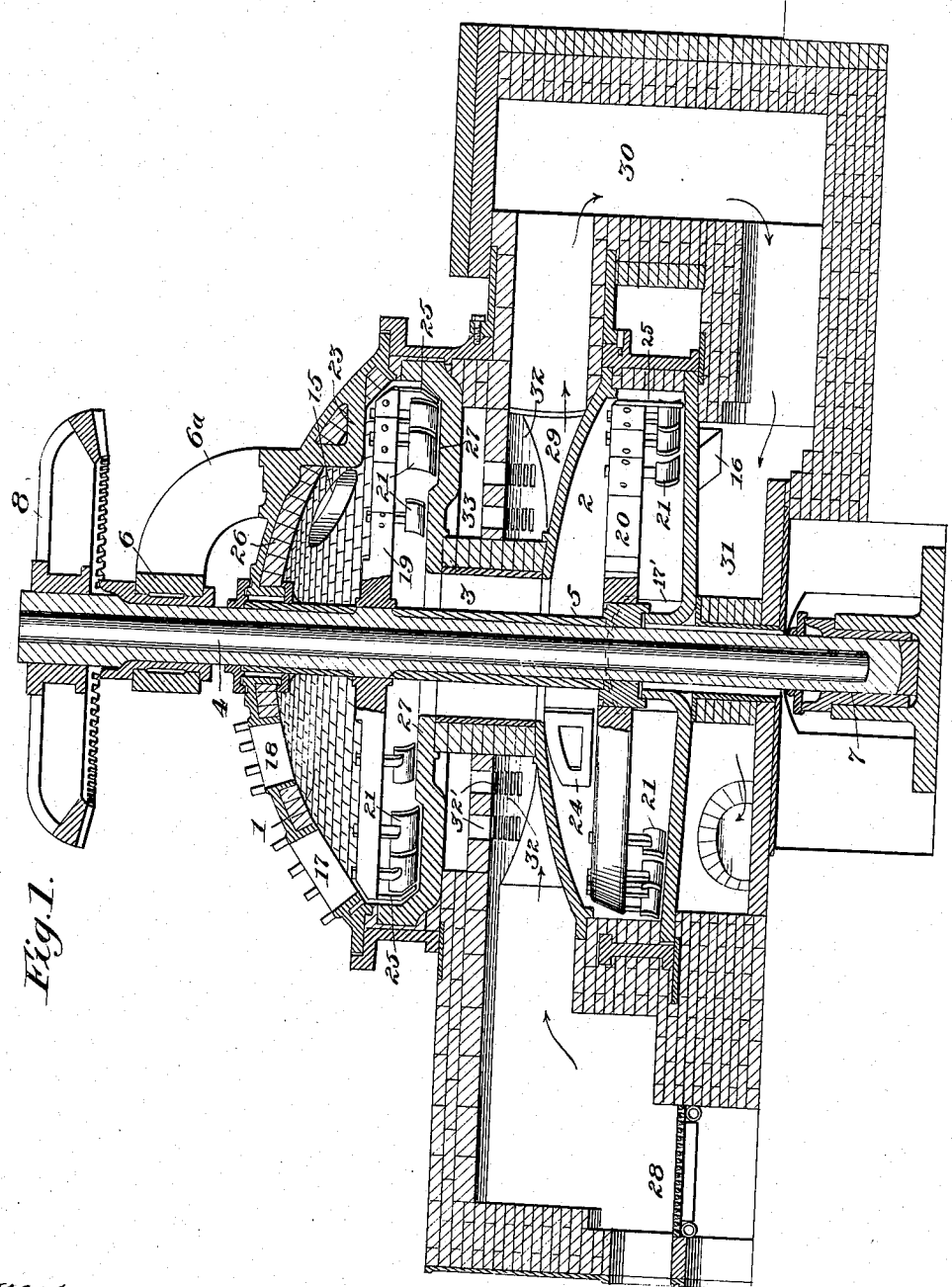

J. L. TUFTS.
METHOD OF MAKING ACIDS.
APPLICATION FILED JUNE 19, 1906. RENEWED APR. 22, 1909.

930,442.

Patented Aug. 10, 1909.
2 SHEETS—SHEET 1.

Witnesses:
Inventor:
John L. Tufts,
by Byrnes & Townsend
Atty's.

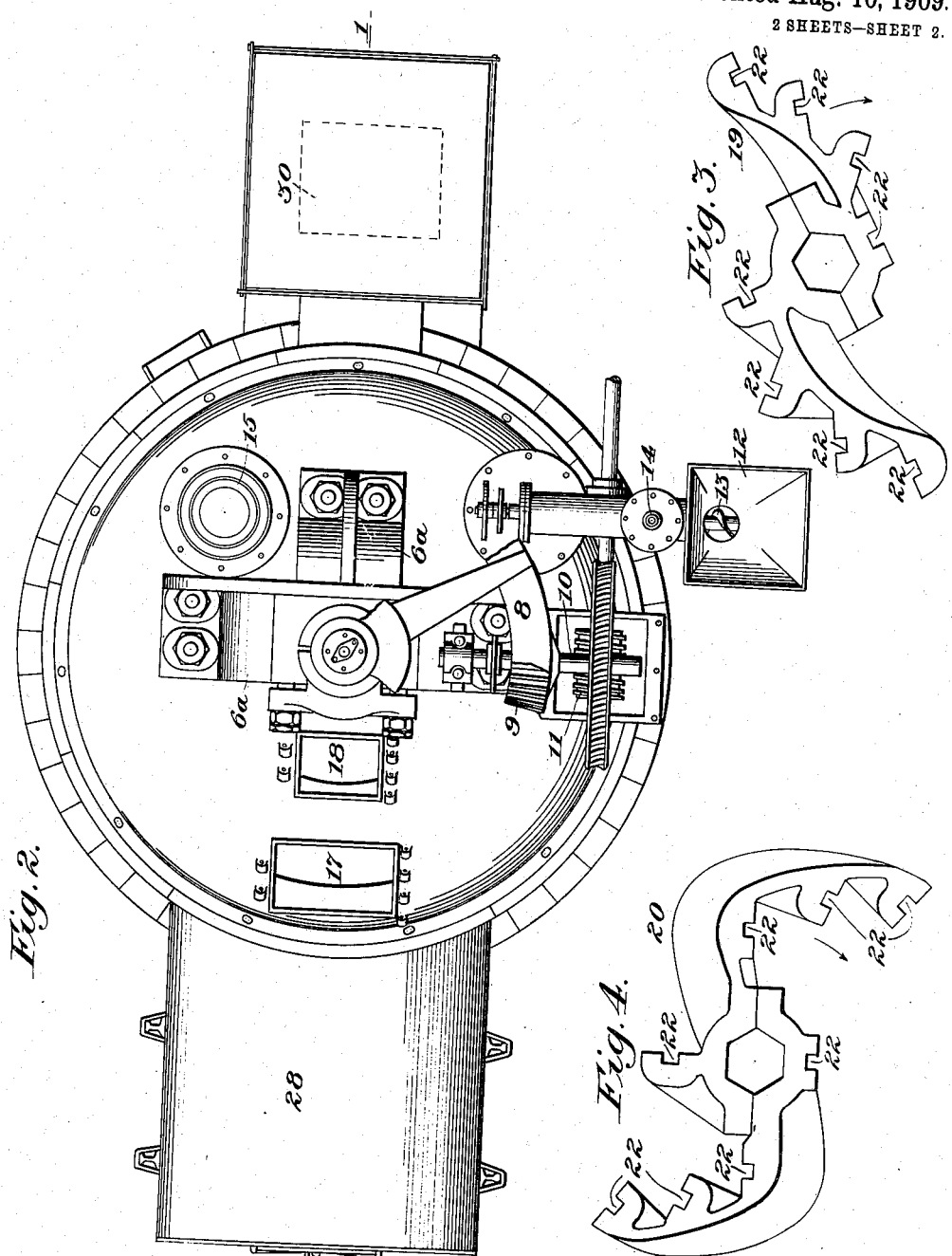

UNITED STATES PATENT OFFICE.

JOHN L. TUFTS, OF BOSTON, MASSACHUSETTS, ASSIGNOR OF ONE-HALF TO MERRIMAC CHEMICAL COMPANY, A CORPORATION.

METHOD OF MAKING ACIDS.

No. 930,442.  Specification of Letters Patent.  Patented Aug. 10, 1909.

Application filed June 19, 1906, Serial No. 322,408. Renewed April 22, 1909. Serial No. 491,609.

*To all whom it may concern:*

Be it known that I, JOHN L. TUFTS, a citizen of the United States, residing at Boston, in the county of Suffolk and State of Massachusetts, have invented certain new and useful Improvements in Methods of Effecting Reactions, of which the following is a specification.

This invention is a method of effecting in an economical, efficient and continuous manner such reactions as preferably take place in two or more practical working stages, the reaction mixture passing during the initial stage through a pasty, fluid or mobile condition as distinguished from the solid condition which is attained as the reaction proceeds.

According to my invention the reaction is carried out in separate but communicating chambers corresponding in number to the number of practical working stages. The reacting bodies are preferably supplied in a substantially continuous manner to the first of these chambers, and are maintained therein at a moderate temperature with constant working, stirring or rabbling to promote the reaction. From this first chamber the reaction mixture or portions of the same pass through the relatively mobile or fluid condition hereinafter referred to as the "pasty stage" and attain the solid condition; as the materials become solid they are withdrawn from the first chamber and transferred to a second chamber in which they are subjected to such higher temperature as the reaction may require. The removal of the solid portions from the first chamber is accomplished without interfering with the course of the reaction or its continuous character, the pasty portions of the mixture being permitted to remain until they in turn assume the solid condition.

As examples of reactions which pass through the pasty stage above referred to I may refer to the production of hydrochloric acid by reaction between sodium chlorid and sulfuric acid, and the production of acetic acid by the decomposition of calcium acetate by sulfuric acid. I will describe the method by reference to the manufacture of hydrochloric acid, it being understood that the invention is not restricted thereto.

For a full understanding of the invention reference is made to the accompanying drawings showing a preferred form of apparatus for carrying the same into effect.

Figure 1 is a vertical longitudinal section of a preferred form of furnace on line 1—1 of Fig. 2; Fig. 2 is a plan view of the apparatus shown in Fig. 1, portions of the bevel gear for operating the stirring mechanism being broken away; and Figs. 3, 4 are plan views of stirring arms adapted for use in the upper and lower chambers, respectively.

Referring to the drawings, the furnace is shown as comprising superposed chambers 1, 2, communication between which is established through a vertical flue 3.

4 is a vertical shaft, suitably incased as indicated at 5, extending through the chambers and the flue 3 and mounted in suitable upper and lower bearings 6 and 7, the upper bearing 6 being supported by yokes 6ª mounted on the furnace casing. A bevel gear 8 secured to the shaft 4 above the upper chamber 1 meshes with a bevel gear 9 carried by a shaft 10 and adapted to be driven by a worm gear 11; for clearness of illustration the casing of the worm gear 11, which carries also the bearings for the shaft 10, is removed.

It will be understood that the shaft may be driven by a bevel gear or equivalent means secured to the lower portion thereof. The charge, which may consist in one specific instance of sodium chlorid and sulfuric acid in reacting proportions, is fed, preferably continuously, to the upper chamber at a point near the periphery thereof. In the construction shown the salt is supplied to a hopper 12, and carried by a screw conveyer 13 to the chamber 1, the acid being introduced into the casing of said conveyer intermediate its ends through pipe 14; this arrangement insures a thorough mixing of the charge prior to its introduction into the furnace. An aperture for the escape of gaseous reaction products is provided at 15, in the dome of the upper reaction chamber, and communicates with suitable condensing or collecting devices as will be readily understood; and a self-sealing discharge gate 16 is provided near the periphery of the lower chamber. 17, 18 represent normally closed apertures affording access to the interior of the furnace; an aperture 17' gives access to the chamber 2.

Secured to the shaft 4 and projecting into the upper and lower chambers respectively are arms 19, 20 carrying adjustably mounted plows or mixing or stirring blades 21 adapted in curvature and set to effectively work and transfer the materials, as hereinafter described. Said arms are shown in plan in Figs. 3, 4: the plows carried by the arm 19 in the upper chamber are so disposed as to move the solid portions of the mixture inwardly and to discharge the same by flue 3 into the lower chamber, the plows in said lower chamber being so disposed as to move the mixture outwardly and to discharge it through the peripheral opening or openings 16. It will be noted that the sockets 22 carrying the plow blades are so disposed in each of these arms that the material displaced by the plows carried by one half-arm is moved directly into the path of a plow carried by the other half-arm, thereby effecting a positive transfer of the material in the direction above indicated. The plows may be held rigidly in the sockets of the plow arms or may have a free vertical movement therein.

In order to prevent the charge from massing under any conditions around and above the stirring arms, I prefer to provide in each chamber one or more stationary wipers 23, 24, preferably in the form of open frames or blades of metal projecting from the domes of the respective chambers; these wipers are disposed immediately above the plow arms and serve as above noted to prevent accumulation thereon of the reacting mass even when in the condition of a very stiff and heavy paste. In order to prevent accumulation of material on the sides of the chambers I preferably provide scrapers 25, illustrated as integral with the clamping member of the outermost plow in each chamber.

The hearth and dome of each chamber are preferably constructed of cast iron, the wall of the lower chamber being indicated as interiorly faced with refractory brick. Where a comparatively high temperature is employed cast iron may be exposed to the reacting mixture and its products without serious or rapid corrosion, whereas at relatively low temperatures it is attacked with comparative rapidity owing to condensation of acid. For this reason I prefer to provide a refractory lining, as indicated at 26, for such interior surfaces as are not in immediate proximity to the flues, as, for instance, the dome of the upper reacting chamber.

It is desirable in effecting reactions of the character above described that the material should be retained in the upper chamber until the initial stage of the reaction is complete and until it has reached a solid as distinguished from a pasty or mobile condition. It is further desirable that the material in said upper chamber should be subjected to a relatively low temperature, and that the rate of evolution of gas therefrom should be maintained as nearly constant as is practicable in order that the condensers may be effectively utilized. In the hearth of the upper chamber 1 I provide one or more peripheral channels or depressions 27, into the outer of which the fresh material is fed and in which it is worked by the outer plows 21, being kept by means of these channels or depressions in a more or less stratified condition. This material being in the pasty or mobile condition above described is not displaced from the channels by the plows, but is merely worked, stirred or moved therein until portions of it become solid, whereupon such portions are displaced from the channel by the plows, to be discharged by flue 3 into the lower chamber. Such working and transfer of the material in the initial stage of the reaction is automatically effected, and the arrangement is such as to insure the retention of the charge in the upper chamber until it has attained the solid state and is adapted for treatment at a higher temperature in the lower chamber.

In order to secure the proper temperature conditions in the respective chambers, I prefer to provide a combustion furnace 28, having flues 29, 30, 31 extending between the chambers and thence beneath the lower chamber. Beneath the upper or initial chamber 1, and within the flue 29, I arrange means for preventing direct access of the heated flue gases to the hearth of said initial chamber: any means which will check or prevent the direct circulation of the heated gases in contact with this hearth will suffice, such, for instance, as a partition extending inwardly from the setting of the hearth but providing an annular aperture around the sheathing of the vertical flue 3; my preferred construction, however, is a checkerwork arch of fire-brick as indicated at 32 in Fig. 1, providing a dead gas space 33 beneath the hearth of the upper chamber said gas space communicating through numerous apertures 32' with the flue 29. This arrangement of flues insures a proper distribution of heat with a marked economy of fuel. The lower or calcining chamber 2 is subjected to a high and uniform temperature, while the upper chamber receives such moderate heating as the initial stage of the reaction requires, and no portion of the chambers or of the furnace construction is liable to overheating.

The apparatus herein described is claimed in my copending application, Serial Number 322,409, filed June 22, 1906.

I claim:

1. The continuous method of producing volatile acids which consists in commingling a salt of such acid and an acid body capable of decomposing the same, working the mixture under the influence of heat until portions of the same become solid, continuously displacing such solid portions from the remaining pasty portions, continuing the working of said pasty portions and subjecting the displaced solid portions to the action of heat.

2. The continuous method of producing hydrochloric acid which consists in commingling a chlorid and an acid body capable of decomposing the same, working the mixture under the influence of heat until portions of the same become solid, continuously displacing such solid portions from the remaining pasty portions, continuing the working of said pasty portions and subjecting the displaced solid portions to the action of heat.

3. The continuous method of producing hydrochloric acid which consists in commingling sodium chlorid and sulfuric acid, working the mixture under the influence of heat until portions of the same become solid, continuously displacing such solid portions from the remaining pasty portions, continuing the working of said pasty portions and subjecting the displaced solid portions to the action of heat.

4. The continuous method of producing hydrochloric acid which consists in commingling a chlorid and an acid body capable of decomposing the same, working the mixture at a moderate temperature until portions of the same become solid, continuously displacing such solid portions from the remaining pasty portions, continuing the working of said pasty portions, and subjecting the displaced solid portions to a higher temperature.

5. The continuous method of producing hydrochloric acid which consists in commingling sodium chlorid and sulfuric acid, working the mixture at a moderate temperature until portions of the same become solid, continuously displacing such solid portions from the remaining pasty portions, continuing the working of said pasty portions, and subjecting the displaced solid portions to a higher temperature.

In testimony whereof, I affix my signature in presence of two witnesses.

JOHN L. TUFTS.

Witnesses:
ARTHUR P. CARPENTER,
FRANCIS M. RYDER.